United States Patent
Tetsuka (10) Patent No.: US 7,340,976 B2
(45) Date of Patent: Mar. 11, 2008

(54) BICYCLE CABLE SEAL FITTING

(75) Inventor: Toshio Tetsuka, Sakai (JP)

(73) Assignee: Shimano Inc., Osaka (JP)

( * ) Notice: Subject to any disclaimer, the term of this patent is extended or adjusted under 35 U.S.C. 154(b) by 323 days.

(21) Appl. No.: 10/977,493

(22) Filed: Nov. 1, 2004

(65) Prior Publication Data
US 2005/0098339 A1    May 12, 2005

(30) Foreign Application Priority Data
Nov. 12, 2003    (JP) .............................. 2003-382020

(51) Int. Cl.
| | |
|---|---|
| *F15C 1/10* | (2006.01) |
| *F16C 1/22* | (2006.01) |
| *F16C 1/26* | (2006.01) |
| *F16D 65/14* | (2006.01) |

(52) U.S. Cl. ...................... 74/502.4; 74/502.6; 188/2 D
(58) Field of Classification Search ............... 74/502.4, 74/502.6, 501.6; 188/2 D; 184/16; B62M 25/02
See application file for complete search history.

(56) References Cited

U.S. PATENT DOCUMENTS

| | | | | |
|---|---|---|---|---|
| 4,823,915 A | * | 4/1989 | Nagano ...................... | 188/2 D |
| 4,889,005 A | * | 12/1989 | Crack ......................... | 74/501.6 |
| 5,105,682 A | * | 4/1992 | Jung .......................... | 74/502.4 |
| 5,765,446 A | * | 6/1998 | Patterson et al. ........... | 74/502.4 |
| 5,785,152 A | * | 7/1998 | Fujita et al. ................. | 184/16 |
| 5,875,687 A | | 3/1999 | Oda et al. | |
| 5,988,011 A | | 11/1999 | Crepin | |
| 6,014,910 A | * | 1/2000 | Oda et al. .................... | 74/502.6 |
| 6,405,613 B1 | * | 6/2002 | Lim ........................... | 74/502.4 |
| 6,443,032 B1 | | 9/2002 | Fujii et al. | |

FOREIGN PATENT DOCUMENTS

| | | |
|---|---|---|
| DE | 225753 A1 | 8/1985 |
| FR | 970469 | 1/1951 |
| FR | 1255099 | 3/1961 |
| JP | 63-104232 U | 7/1988 |

(Continued)

OTHER PUBLICATIONS

Plastic—Wikipedia, the free encyclopedia, http://en.wikipedia.org/wiki/Plastic, Mar. 13, 2007.*

(Continued)

*Primary Examiner*—Vinh T. Luong
(74) *Attorney, Agent, or Firm*—Global IP Counselors, LLP (57) ABSTRACT

A bicycle cable seal fitting seals a portion of an inner wire that is connected to a cable-operated device casing. The bicycle cable seal fitting includes a mounting member and an elastic seal member. The mounting member has a fastening portion to be fastened to the casing, and an inner wire guiding passage with a funnel shaped section that widens as it extends towards the fastening portion. The seal member includes an attaching portion, and a seal portion forming a sealing passage that communicates with the inner wire guiding passage. The seal portion includes a first section with a first width and a second section with a second width that is smaller than the first width of the first section to contact an outside surface of the inner wire passing therethrough. The first section is disposed between the funnel shaped section and the second section.

13 Claims, 6 Drawing Sheets

FOREIGN PATENT DOCUMENTS

| | | |
|---|---|---|
| JP | 63-180715 U | 11/1988 |
| JP | 2-10816 Y2 | 3/1990 |
| JP | 3-9142 A | 1/1991 |
| JP | 7-126993 A | 5/1995 |
| JP | 7-38741 U | 7/1995 |
| JP | 979088 S | 4/1997 |
| JP | 10-24889 A | 1/1998 |
| JP | 11-325046 A | 11/1999 |
| JP | 2000-2228 A | 1/2000 |
| JP | 2001-191974 | 7/2001 |
| TW | 333177 | 6/1998 |
| TW | 348696 B | 12/1998 |

OTHER PUBLICATIONS

Resin—Wikipedia, the free encyclopedia, http://en.wikipedia.org/wiki/Resin, Mar. 12, 2007.*

Acrylonitrile butadiene styrene—Wikipedia, the free encyclopedia, http://en.wikipedia.org/wiki/Acrylonitrile-butadiene-styrene, Mar. 10, 2007.*

Styrene- Wikipedia, the free encyclopedia, http://en.wikipedia.org/wiki/Styrene, Feb. 27, 2007.*

* cited by examiner

BICYCLE CABLE SEAL FITTING

BACKGROUND OF THE INVENTION

1. Field of the Invention

The present invention relates to a bicycle cable seal fitting. More specifically, the present invention relates to a bicycle cable seal fitting configured to seal a portion of an inner wire that is connected to a case of a cable-operated device that can be mounted to a bicycle.

2. Background Information

Hand-operated bicycle parts or components are often operated by a cable having an outer casing and an inner wire that passes through the outer casing. The inner wire of the cable is connected at one end to the hand-operated part and at the other end to a gear changing device, a brake device, and any other cable-operated device of a bicycle. Recently, arrangements have been developed (e.g., Japanese Laid-Open Patent Publication No. 2001-191974) in which a gear change assisting mechanism, i.e., cable-operated device, is provided between the hand-operated gear shifting part and the gear changing device. In these arrangements inner wires are connected between the hand-operated gear shifting part and gear change assisting mechanism and between the gear change assisting mechanism and the gear changing device, such that the gear changing device is operated by manipulating the hand-operated gear shifting part.

When a cable-operated device is operated by an inner wire connected thereto, the inner wire is generally used together with an outer casing through which it passes. However, when the distance between cable-operated devices is short, the two cable-operated devices are sometimes connected with only an inner wire. For example, when a gear change assisting mechanism is provided on the bottom bracket of the bicycle and an inner wire is used to connect the gear change assisting mechanism to the front derailleur (which is another cable-operated device), the two devices are connected with the inner wire alone without using an outer casing.

In view of the above, it will be apparent to those skilled in the art from this disclosure that there exists a need for an improved bicycle cable seal fitting for an inner wire. This invention addresses this need in the art as well as other needs, which will become apparent to those skilled in the art from this disclosure.

SUMMARY OF THE INVENTION

It has been discovered that since the cable-operated devices installed on a bicycle are generally exposed to the outdoors, it is necessary to take steps to improve waterproofing and prevent declines in performance caused by rust and the like. One feasible method to achieve this goal is to enclose the cable-operated device inside a casing. When such a method is used, it is important to ensure good waterproofing at the portion where the cable moves into and out of the casing. If an outer casing is attached to the cable-operated device, a certain degree of waterproofing can be secured by installing a seal member (e.g., an O-ring) between the outer casing and the cable-operated device. However, when an inner wire alone is connected to the cable-operated device, it is difficult to seal the inner wire because it is made of twisted strands of wire and, therefore, its surface is characterized by helical grooves and ridges. Also, depending on the structure, it is sometimes difficult to steer the inner wire out of the casing and the work associated with routing the inner wire to the outside of the casing is troublesome.

One object of the present invention is to provide a bicycle cable seal fitting that improves the waterproofing of a portion of the casing where the inner wire moves into and out of the casing and to make it easier to accomplish the work of routing the inner wire.

In accordance with one aspect of the present invention, a bicycle cable seal fitting is configured to seal a portion of an inner wire that is connected to a cable-operated device having a cable-operated bicycle component casing casing that can be mounted to a bicycle, where the portion of the inner wire is the portion that moves into and out of the casing, the bicycle cable seal fitting including a mounting member and an elastic seal member. The mounting member includes a tip portion, a fastening portion and an inner wire guiding passage. The fastening portion is configured to be fastened to the cable-operated bicycle component casing. The inner wire guiding passage is configured to guide the inner wire though the tip portion and the fastening portion. The inner wire guiding passage has a funnel shaped section having a transverse width that widens as the inner wire guiding passage extends from the tip portion to the fastening portion. The elastic seal member includes an attaching portion and a seal portion. The attaching portion is detachably coupled to the tip portion of the mounting member in a closely fitting manner. The seal portion is configured to form a sealing passage that communicates with the inner wire guiding passage. The seal portion includes a first section with a first transverse width and a second section with a second transverse width that is smaller than the first transverse width of the first section to contact an outside surface of the inner wire passing therethrough. The first section is disposed between the funnel shaped section of the inner wire guiding passage of the mounting member and the second section of the seal portion.

With this bicycle cable seal fitting, the fastening portion is fastened to the casing and the inner wire is passed from the inner wire guiding passage through the seal portion and connected to an external cable-operated device outside the casing. The inner wire passes through the inner wire guiding passage, whose diameter becomes larger as one moves toward the cable-operated device inside the casing, and contacts the seal portion of the seal member as it is steered outside the casing and connected to the external cable-operated device. The inner wire guiding passage provided in the mounting member serves to facilitate easy guiding of the inner wire to the outside when the inner wire is steered out of the casing. As a result, the work associated with routing the inner wire to the outside is simplified. Since the seal portion is provided with a large-diameter part and a contact part that has a smaller diameter than the large-diameter part and contacts the inner wire, the outside surface of the inner wire can be sealed by the seal portion and it is difficult for the seal portion to become folded inward (i.e., curled inside itself) when the inner wire moves outward while the seal portion is in contact with the inner wire. Thus, the waterproofing of the portion of the casing where the inner wire moves into and out of the casing can be improved.

In accordance with a second aspect of the present invention, a bicycle cable seal fitting of the first aspect of the present invention is configured such that the fastening portion is provided with an externally threaded section and the fastening portion is fastened to the casing by being screwed into the casing. This bicycle cable seal fitting can be installed simply by screwing in the fastening portion.

In accordance with a third aspect of the present invention, a bicycle cable seal fitting according to the first or second aspect of the present invention is configured such that the contact length of the seal portion is equal to or greater than 6 millimeters and less than or equal to 15 millimeters. With this bicycle cable seal fitting, the inner wire can be sealed reliably, even though its outside surface has helical grooves and ridges, because the contact length of the seal portion is long.

In accordance with a fourth aspect of the present invention, a bicycle cable seal fitting is a seal fitting according to any one of the first through third aspects of the present invention is provided such that the seal member is made of a styrene based elastomer. With this bicycle cable seal fitting, the sliding resistance of the seal member is reduced and the durability of the seal member is improved in comparison with seal members made of NBR and other elastomers because the seal member is made of a styrene based elastomer, e.g., SBS or SEBS, which is a comparatively hard and lubricious elastic material.

In accordance with a fifth aspect of the present invention, a bicycle cable seal fitting is a seal fitting according to any one of the first through fourth aspects of the present invention is provided such that the tip portion of the mounting member includes a generally cylindrically shaped attaching part for attaching the attaching portion of the seal member to the tip portion of the mounting member. With this bicycle cable seal fitting, since the seal member can be attached to the generally cylindrically shaped attaching part of the mounting member, the elastic seal member can be attached with ease and the seal member and mounting member can be sealed reliably with respect to each other.

In accordance with a sixth aspect of the present invention, a bicycle cable seal fitting is a seal fitting according to the fifth aspect of the present invention is provided such that the cylindrically shaped attaching part has a free end section with a larger diameter than any other portion of the cylindrically shaped attaching part. With this bicycle cable seal fitting, the elastic seal member can be prevented in a simple manner from falling off because the seal member latches onto the large-diameter portion of the cylindrical attaching member.

In accordance with a seventh aspect of the present invention, a bicycle cable seal fitting according to the fifth or sixth aspect of the present invention is configured such that the first and second sections of the seal portion has a generally cylindrical shape that fits against an internal circumferential surface of the cylindrically shaped attaching part. The attaching portion of the seal member is configured to extend from the seal portion over a free end surface of the cylindrically shaped attaching part and cover a radially outward facing surface of the cylindrically shaped attaching part to latch onto the outward facing surface of the cylindrically shaped attaching part. With this bicycle cable seal fitting, the seal member can be reliably attached to and sealed with respect to the cylindrical attaching portion because the attaching portion is formed such that it bends from its cylindrical portion so as to follow the contour of the outside surface of the cylindrical attaching portion.

With the present invention, the inner wire guiding passage provided in the mounting member serves to facilitate easy guiding of the inner wire to the outside when the inner wire is steered out of the casing. As a result, the work associated with routing the inner wire to the outside is simplified. Since the seal portion is provided with a large-diameter part and a contact part that has a smaller diameter than the large-diameter part and contacts the inner wire, the outside surface of the inner wire can be sealed by the seal portion and it is difficult for the seal portion to become folded inward (i.e., curled inside itself) when the inner wire moves outward while the seal portion is in contact with the inner wire. Thus, the waterproofing of the portion of the casing where the inner wire moves into and out of the casing can be improved.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
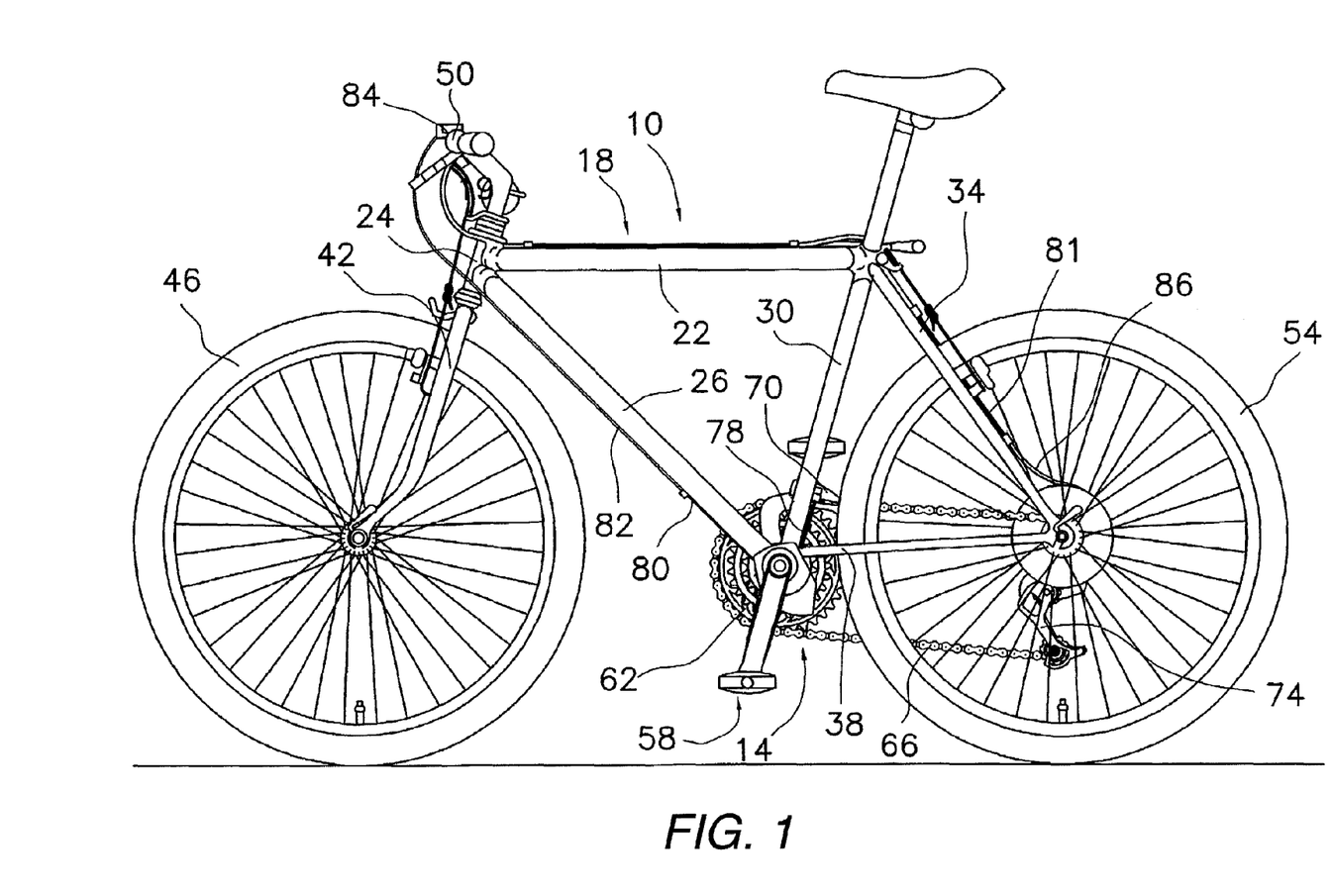
FIG. 1 is a side elevational view of a bicycle that is equipped with a bicycle cable seal fitting in accordance with a first embodiment of the present invention.

Referring initially to FIG. 1, a bicycle 10 is illustrated that is equipped with a gear change assisting mechanism 14 in accordance with a first embodiment of the present invention. The bicycle 10 can be any type of bicycle. In this embodiment, the bicycle 10 has a typical frame 18 that basically includes a top tube 22, a head tube 24, a down tube 26, a seat tube 30, a bottom bracket tube 32 (FIG. 2), a pair of seat stays 34, and a pair of chain stays 38. The down tube 26 extends downwardly from the head tube 24, while the seat tube 30 extends downward from the top tube 22. The bottom bracket tube 32 (FIG. 2) is positioned at the portion where down tube 26 joins the seat tube 30. The seat stays 34 extend rearward and downward from the top tube 22, while the chain stays 38 extend rearward from the bottom bracket tube 32. A fork 42 is supported in a freely rotatable manner inside the head tube 24. A front wheel 46 is supported in a freely rotatable manner on the bottom end section of the fork 42. The direction of the fork 42 and the front wheel 46 is controlled with the handlebar 50 using a known method. A rear wheel 54 having a plurality of sprockets (not shown) mounted thereto in a coaxial manner is supported in a freely rotatable manner to the portions where the seat stays 34 and chain stays 38 join each other. A pedal assembly 58 that supports a plurality of front sprockets (chain wheels) 62 is supported in a freely rotatable manner inside the bottom bracket tube 32. In this embodiment, three front sprockets 62 are configured to rotate integrally with the pedal assembly 58 about a common rotational axis. The chain 66 engages with one front sprocket 62 and one freewheel sprocket mounted to the rear wheel 54. A front derailleur 70 functions to move the position of the chain 66 from one front sprocket 62 to another and a rear derailleur 74 functions to move the position of the chain 66 from one freewheel sprocket to another. Both derailleurs are operated by the rider in a well-known manner.

In this embodiment, the front derailleur 70 is controlled by pulling and releasing an output-control-purpose inner wire 78 connected to the gear change assisting mechanism 14. The gear change assisting mechanism 14 is controlled by an inner wire 80 of a gear shift cable 82 connected to a shift control device 84 mounted to the left side of the handlebar 50. The rear derailleur 74 is controlled by the inner wire 81 of a gear shift cable 86 using a conventional method.

Gear Change Assisting Mechanism

Figure 2:
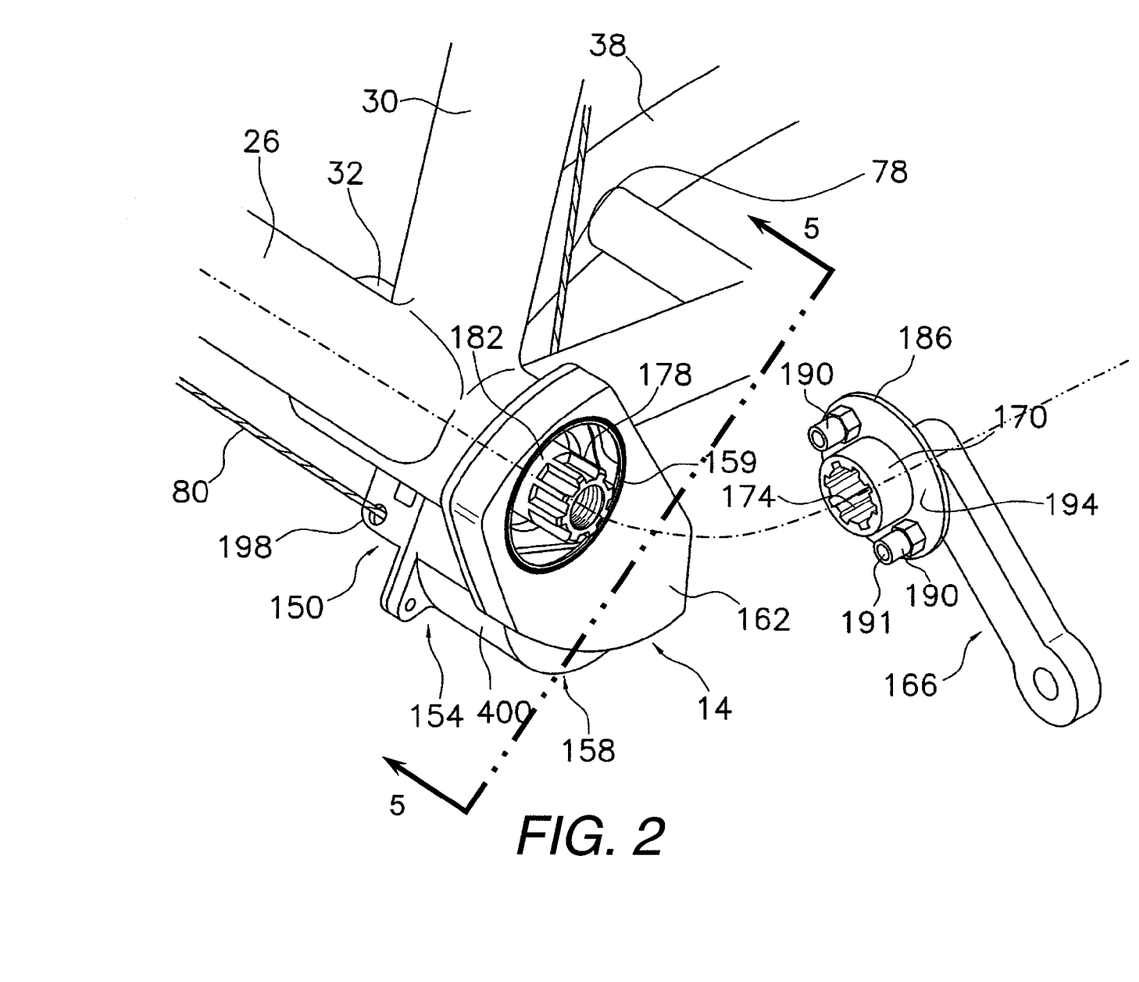
FIG. 2 is an enlarged partial perspective view of the bicycle illustrated in FIG. 1 that shows a gear change assisting mechanism that is equipped with the bicycle cable seal fitting in accordance with the first embodiment of the present invention.

FIG. 2 shows the gear change assisting mechanism 14 in further detail. As shown in FIG. 2, the gear change assisting mechanism 14 is mounted to the bottom bracket tube 32, and includes an input unit 150, a positioning unit 154, a rotary member engagement unit 158, a cover 162 mounted to the rotary member engagement unit 158, and a cable-operated bicycle component casing 400 that houses the positioning unit 154. In the present invention, the gear change assisting mechanism 14 is used together with the crank arm 166. The crank arm 166 has a drive shaft mounting boss 170. The drive shaft mounting boss 170 has a plurality of crank arm splines 174 that mesh in a non-rotatable manner with a plurality of drive shaft splines 178 formed on the end portion of a drive axle 182 supported in a freely rotatable manner in the bottom bracket tube 32. A drive flange 186 extends radially outward from the drive shaft mounting boss 170. Two rotary members 190 are supported on the drive flange 186 at positions radially opposite each other. The two rotary members 190 function as drive members for executing the gear change operation. The drive members 190 are cylindrical members mounted in a freely rotatable manner to shafts 191 provided in a standing posture on a lateral surface 194 of the drive flange 186. The gap between the drive flange 186 and the cover 162 is sealed with a seal member 159 (e.g., an O-ring) installed on the cover 162.

Figure 3:
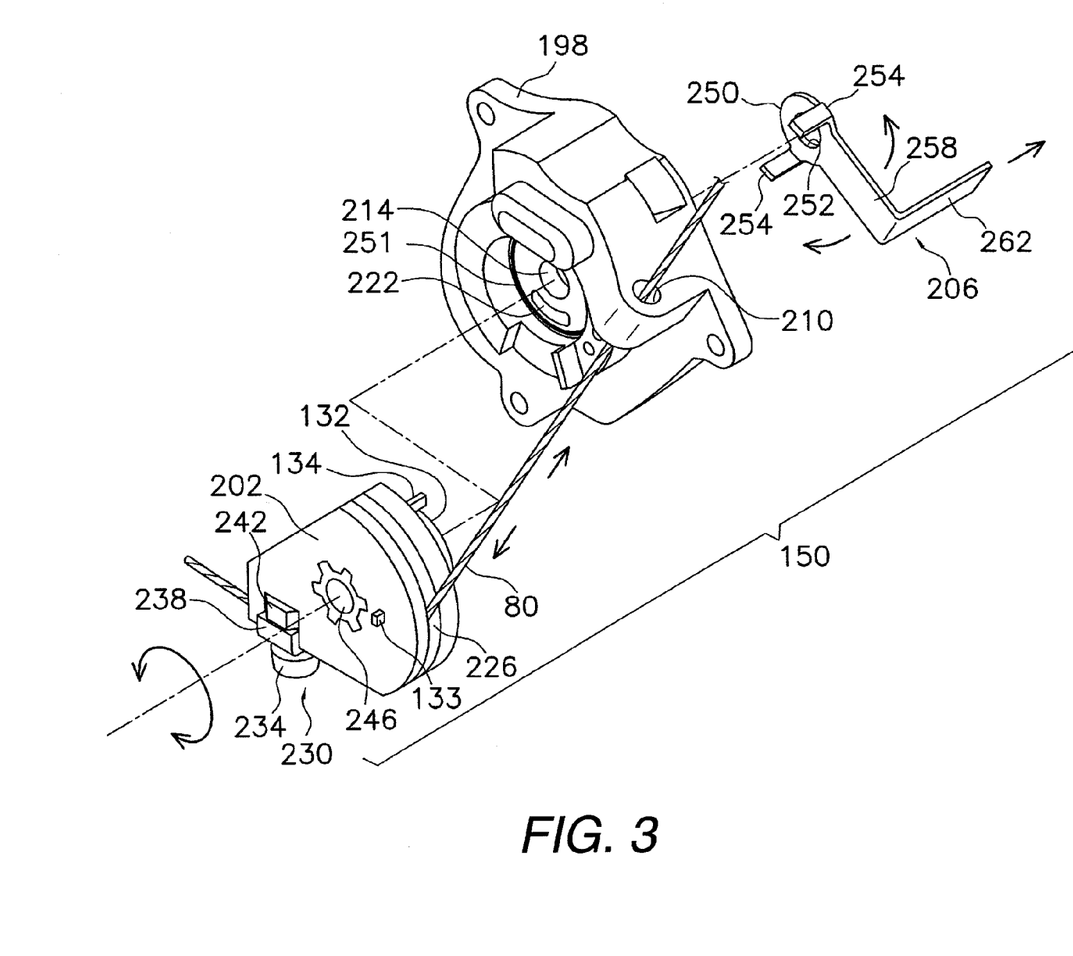
FIG. 3 is an exploded perspective view of selected parts of the input unit of the gear change assisting mechanism illustrated in FIG. 2 in accordance with the first embodiment of the present invention.

FIG. 3 is an exploded view of a specific embodiment of the input unit 150. The input unit 150 includes an input unit mounting member 198, a wire connecting member 202, a torsional coil spring 132, and an input link 206. The input unit mounting member 198 has a guide hole 210 for the inner wire 80, a center drive shaft opening 214 configured to house the drive shaft 218 (FIG. 5) of the positioning unit 154, and a pair of openings 222 (only one shown in FIG. 3) positioned diametrically opposite each other. The wire connecting member 202 includes a wire winding mechanism that winds and tensions the inner wire 80, a wire connecting section 230 that operates using a screw 234, a wire holding part 238, a nut 242 that fastens the inner wire 80 to the wire connecting member 202, and a drive shaft opening 246 that houses the drive shaft 218 of the positioning unit 154. The input link 206 serves to transmit the rotational position of the wire connecting member 202 to the positioning unit 154. The input link 206 includes a drive shaft mounting section 250 provided with a drive shaft mounting opening 252, a pair of connecting tabs 254, a radially extended section 258, and an axially extended connecting section 262. The connecting tabs 254 extend axially from the drive shaft mounting section 250 and pass through the openings 222 in the input unit mounting member 198 and the corresponding openings (not shown) in the wire connecting member 202. This arrangement allows the connecting member 202 and the input link 206 to rotate as a unit. Thus, the connecting member 202 and the input link 206 both assume one of three gear change positions, i.e., an intermediate position, a high-speed position, or a low-speed position, in accordance with the shift position of the shift control device 84. In order to spring-load the wire connecting member 202 and input link 206 in the clockwise (wire winding) direction, one end 133 of the torsional coil spring 132 is attached to the wire connecting member 202 and the other end 134 is attached to the input unit mounting member 198. The gap between the wire connecting member 202 and the input unit mounting member 198 is sealed with a seal member 251 (e.g., an O-ring) installed on the input unit mounting member 198. As a result, it is difficult for water and contaminants to enter the casing 400, which is covered by the input unit mounting member 198 and the cover 162.

Figure 4:
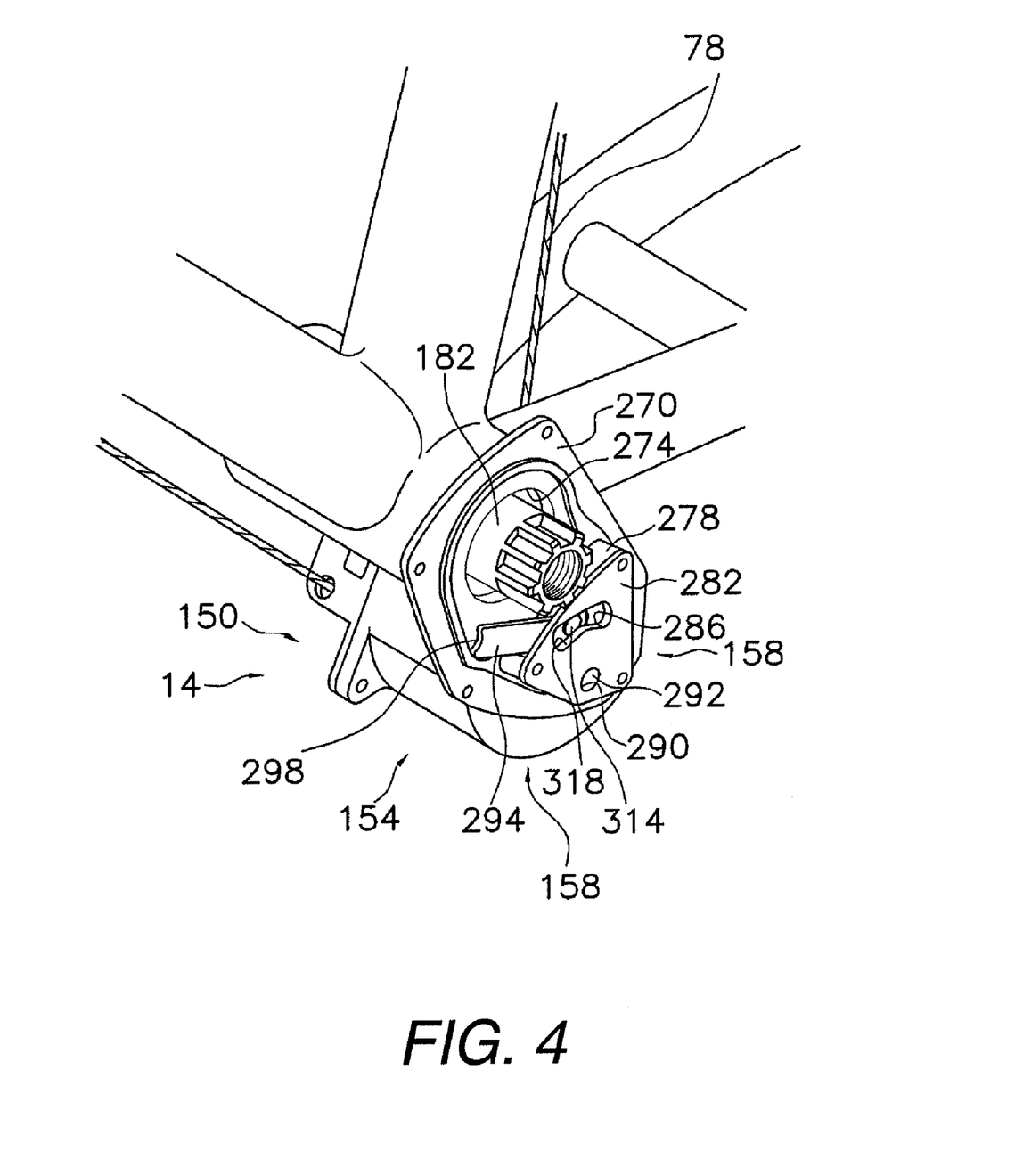
FIG. 4 is a perspective view of a rotary member engagement unit that is equipped with the bicycle cable seal fitting in accordance with the first embodiment of the present invention.
Figure 5:
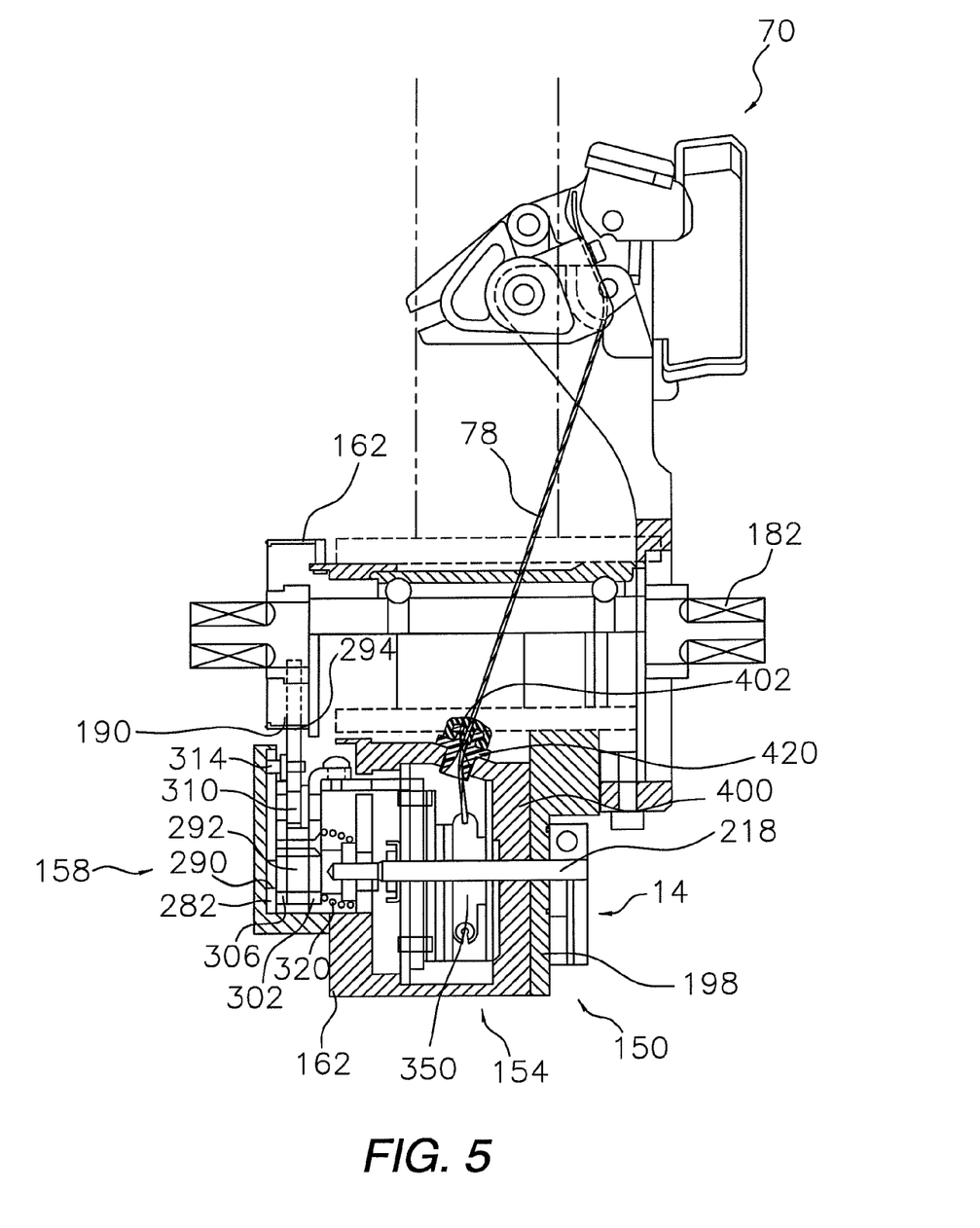
FIG. 5 is a longitudinal cross sectional view of the gear change assisting mechanism that is equipped with the bicycle cable seal fitting in accordance with the first embodiment of the present invention, as seen along section line 5-5 of FIG. 2.

FIG. 4 is a perspective view of the gear change assisting mechanism 14 with the cover 162 of the rotary member engagement unit 158 removed, while FIG. 5 is a rear cross sectional view of the gear change assisting mechanism 14. As shown in FIGS. 4 and 5, the rotary member engagement unit 158 includes a bottom bracket mounting member 270 (FIG. 4) having an opening 274 that houses the drive axle 182, a side wall 278 that extends in the axial direction, a cam plate 282 that has a control cam slot 286 and is mounted to the side wall 278, and an opening 290 that supports a lower pivot shaft 292. A rotary member engaging member 294 has a tip end portion that is shaped like a lever in this embodiment. Preferably, the rotary member engaging member 294 has a bow-shaped rotary member engaging surface 298 for engaging with a drive member 190 on the crank arm 166. A base end portion of the rotary member engaging member 294 is connected in a freely swingable manner between a positioning unit interface plate 302 and a support plate 306 by a pivot shaft 310 (FIG. 5). The base end portion of the rotary member engaging member 294 constitutes a rotary member engaging link. A cam follower 314 is arranged between the tip end portion and the base end portion of the rotary member engaging member 294 in a position very close to the pivot shaft 310. The cam follower 314 engages with the control cam surface 318 formed by the cam slot 286. A spring 320 (FIG. 5) serves to spring-load the positioning unit interface plate 302 and the support plate 306 in the counterclockwise direction. In this embodiment, the positioning unit interface plate 302, the support plate 306, the cam follower 314, and the control cam surface 318 are configured to fix to the rotary member engaging member 294 in a rotary member engaging position and return the rotary member engaging member 294 to a rotary member non-engaging position. Also, although in this embodiment the cam follower 314 is provided on the rotary member engaging member 294, it is also possible to arrange the cam follower inside the slot 286 and provide a control cam on the rotary member engaging member 294.

As shown in FIG. 4, when the rotary member engaging member 294 is in the rotary member non-engaging position where the tip end of the rotary member engaging member 294 does not engage with the drive members 190, the drive members 190 rotate together with the crank arm 166 without exerting any action whatsoever against the gear change assisting mechanism 14. When the shift control device 84 is rotated to either the high-speed position or the low-speed position, the positioning unit interface plate 302 and the support plate 306 (both shown in FIG. 5) turn counterclockwise (i.e., counterclockwise from the perspective of FIG. 4). As a result, since the cam follower 314 stops at the rotary member engaging position inside the cam slot 286, the rotary member engaging member 294 swings clockwise about the pivot shaft 310. In this position, one of the drive members 190 contacts the rotary member engaging surface 298 because the rotary member engaging surface 298 is in the path of the drive members 190 and the rotary member engaging member 294 rotates the positioning unit interface plate 302 and the support plate 306 clockwise against the spring force of the spring 320. As the crank arm 166 continues rotating, the engaged drive member 190 disengages from the rotary member engaging member 294 and the rotary member engaging member 294 swings counterclockwise to return to the rotary member non-engaging position. As result, the spring 320 turns the positioning unit interface plate 302 and the support plate 306 counterclockwise and returns them to the position shown in FIG. 4.

The positioning unit 154 serves to move the inner wire 80 (which is connected to the front derailleur 70) to a low-speed position, a medium-speed position, or a high-speed position. The positioning unit 154 operates in an interlocking manner with respect to the input link 206 and the movement of the rotary member engaging member 294 is controlled by the operation of the positioning unit 154. The movement of the rotary member engaging member 294 positions the inner wire 80*b* among the following three gear change positions: a high-speed position (which positions the front derailleur such that the chain is placed on the largest-diameter sprocket), a medium-speed position (which places the chain on the medium-diameter sprocket), and a low-speed position (which places the chain on the small-diameter sprocket).

The positioning unit 154 is enclosed inside the casing 400, one side of which is covered by the input unit mounting member 198. The other side of the casing is covered by the cover 162. The drive shaft 218 is mounted in a freely rotatable manner inside the casing 400. A winding body 350 for winding the inner wire 78 is mounted to the drive shaft 218. The inner wire 78 passes through a cable seal fitting 420 screw-fastened to the casing 400 and is routed toward the front derailleur 70.

Figure 6:
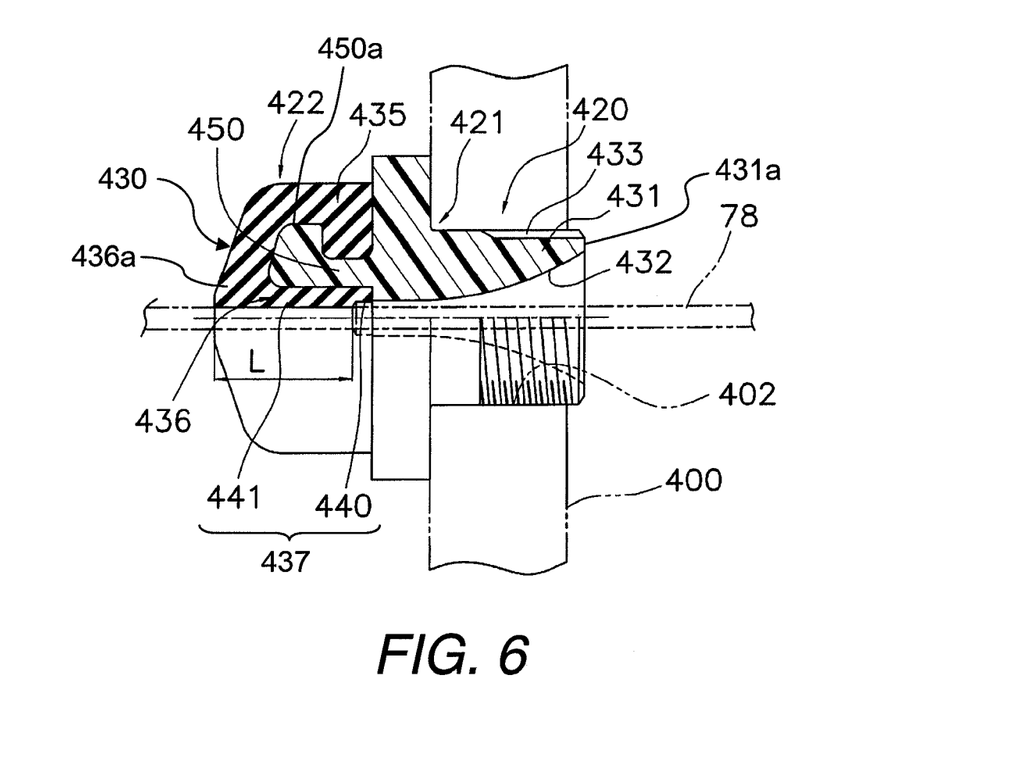
FIG. 6 is an enlarged, half cross sectional view of the bicycle cable seal fitting illustrated in FIG. 5 in accordance with the first embodiment of the present invention (i.e., as seen along section line 5-5 of FIG. 2)

As shown in FIG. 6, the cable seal fitting 420 has a mounting member 421 that is fastened to the casing 400 and an elastic seal member 422 that is made of an elastic material and attached to the mounting member 421. The mounting member 421 includes a tip portion or tip end 430, a fastening portion 431 and an inner wire guiding portion or passage 432. The fastening portion 431 is provided on a base end of the mounting member 421 and can be fastened (screwed) to the casing 400. The inner wire guiding passage 432 is provided inside the fastening portion 431 such that the inner wire 78 can pass therethrough from the base end toward the tip portion or tip end 430 of the mounting member 421. The inner wire guiding passage 432 is configured with a funnel shaped section having a transverse width or diameter that widens toward the positioning unit 154. In other words, the transverse width or diameter widens of funnel shaped section as the inner wire guiding passage 432 extends from the tip portion 430 toward a the free end 431 a of the fastening portion 431. The fastening portion 431 is provided with, for example, an M8 (JIS) size externally threaded section 433 in consideration of the fact that the diameter of the inner wire 78 is normally approximately 1.2 mm, and the fastening portion 431 is fastened by being screwed into a mounting hole 402 formed diagonally in the upper surface of a rear portion of the casing 400. The inner wire guiding passage 432 is formed to have a smoothly curved trumpet-shaped surface that widens gradually toward the inside of the casing 400. The tip portion or tip end 430 of the mounting member 421 includes a generally cylindrically shaped attaching part 450 for attaching the seal member 422 to the tip portion 430 of the mounting member 421. The cylindrically shaped attaching part 450 has an annular flange 450*a* with a larger diameter than any other portion of the cylindrically shaped attaching part 450 disposed at a free end of the tip portion 430. This annular flange 450*a* of the cylindrically shaped attaching part 450 is structured such that the seal member 422 can readily latch thereon.

The seal member 422 is made of a styrene based elastomer (which are comparatively hard and durable among elastic materials), such as the styrene based thermoplastic elastomer called ELASTMERAR760 made by Aronkasei Co., Ltd., or the completely hydrogenated styrene based thermoplastic elastomer (SEBS) called RABAON (product name) SJ5400 made by MITSUBISHI Chemical Corporation. The seal member 422 includes an attaching portion 435 and a seal portion 436. The attaching portion 435 is attached in a closely fitting and freely detachable manner to the cylindrical attaching portion 450 provided at the tip portion or tip end 430 of the mounting member 421. The seal portion 436 is formed integrally with the attaching portion 435 as a one-piece, unitary member. The seal portion 436 is configured to form a sealing passage 437 that communicates with the inner wire guiding passage 432. The sealing passage 437 of the seal portion 436 has a first larger-diameter section 440 that communicates with the inner wire guiding passage 432, and has a second contact section 441 that has a smaller diameter than the first large-diameter section 440. The second contact section 441 is configured to contact the outside surface of the inner wire 78.

The attaching portion 435 of the seal member 422 is configured to extend from the seal portion 436 over the annular flange 450*a* and the cylindrically shaped attaching part 450 and cover the a radially outward facing surface of the cylindrically shaped attaching part 450 to latch onto the outward facing surface of the cylindrically shaped attaching part 450. In other words, the attaching portion 435 is configured such that it runs from an outer tip end 436*a* of the seal portion 436 and covers the outer free end portion and radially outward facing portion of the cylindrically shaped attaching part 450 and the annular flange 450*a* to latch the seal member 422 onto the outside surface of the cylindrically shaped attaching part 450.

The seal portion 436 is cylindrically formed such that it fits against the internal circumferential surface of the cylindrically shaped attaching part 450. The first large-diameter section 440 and the second contact section 441 are formed inside the seal portion 436. The inner wire 78 passes through the seal portion 436 and the outside surface of the inner wire 78 is sealed. The contact length L of the seal portion 436 is approximately 10 millimeters. It is preferred for the contact length L of the seal portion 436 to be equal to or greater than 6 millimeters and less than or equal to 15 millimeters. If the contact length L is less than 6 millimeters, it will not be possible to sufficiently seal the outside surface of the inner wire 78, which is characterized by helical grooves and ridges. If the contact length L is larger than 15 millimeters, the contact resistance will become large and possibly inhibit smooth movement of the inner wire 78.

Sealing the inner wire 78 with this kind of cable seal fitting 420 makes it difficult for water and contaminants to penetrate the inside of the casing 400 and helps prevent malfunctioning of the positioning unit 154 housed inside the casing 400. Also, the inner wire guiding passage 432 provided in the mounting member 421 of the cable seal fitting 420 serves to facilitate easy guiding of the inner wire 78 to the outside when the inner wire 78 is steered out of the casing 400. As a result, the work associated with routing the inner wire 78 to the outside is simplified. Furthermore, since the seal portion 436 is provided with the first large-diameter part 440 and the second contact part 441 that has a smaller diameter than the first large-diameter part 440 and contacts the inner wire 78, the outside surface of the inner wire 78 can be sealed by the seal portion 436 and it is difficult for the seal portion 436 to become folded inward (i.e., curled inside itself) when the inner wire 78 moves outward while the seal portion 436 is in contact with the inner wire 78. Thus, the waterproofing of the portion of the casing 400 where the inner wire 78 moves into and out of the casing 400 can be improved.

Second Embodiment

Figure 7:
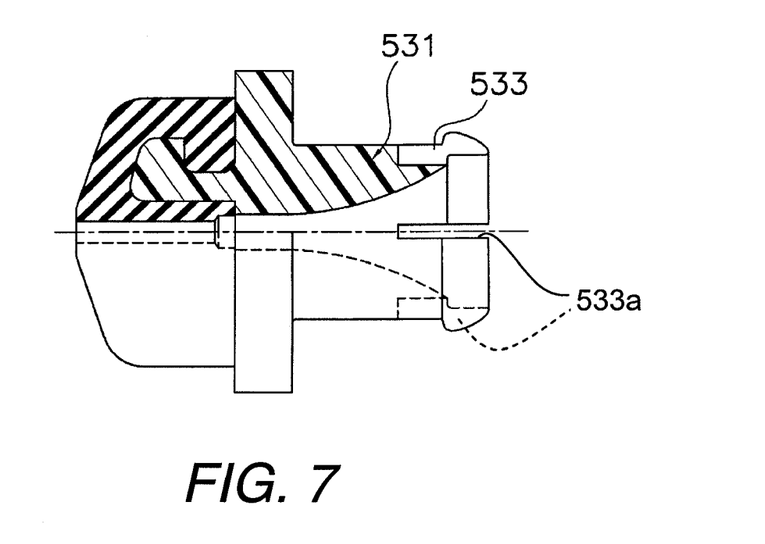
FIG. 7 is an enlarged, half cross sectional view, similar to FIG. 6, of a bicycle cable seal fitting in accordance with a second embodiment of the present invention (i.e., as seen along a section line similar to section line 5-5 of FIG. 2).

Referring now to FIG. 7, a bicycle cable seal fitting in accordance with a second embodiment will now be explained. In view of the similarity between the first and second embodiments, the descriptions of the parts of the second embodiment that are identical to the parts of the first embodiment have been omitted for the sake of brevity. In other words, the descriptions of the parts of the first embodiment apply to the parts of the second embodiment, unless otherwise specified or shown.

Although in the previously described embodiment fastening portion 431 is fastened to the casing 400 via the externally threaded section 433, it is also acceptable to use a fastening portion 531 comprising a plurality of elastic latching pieces 533 formed with slits 533a as seen in FIG. 7. It is also acceptable to use a bayonet structure that is rotated and locked in place.

Other Embodiments

Although in the previously described embodiment a gear change assisting mechanism 14 was presented as an example of a cable-operated device, the cable-operated device in which the present invention is installed is not limited to a gear change assisting mechanism. The present invention can be used in various bicycle oriented cable-operated devices, including electronically controlled derailleurs and suspensions as well as auxiliary devices used to operate such cable-operated devices with an inner wire.

The diameter of the screw-threaded hole 402 can be increased (to 10 millimeters or larger, for example) regardless of the diameter of the inner wire 78. A larger hole diameter makes it easier to see inside the casing 400 from the screw-threaded hole 402, thus making it easier to check and perform maintenance on the positioning unit 154.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

This application claims priority to Japanese Patent Application No. 2003-382020. The entire disclosure of Japanese Patent Application No. 2003-382020 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle cable seal fitting for sealing a portion of an inner wire passing into a cable-operated bicycle component casing, the bicycle cable seal fitting comprising:
   a mounting member including a tip portion, a fastening portion configured to be fastened to the cable-operated bicycle component casing, and an inner wire guiding passage configured to guide the inner wire though the tip portion and the fastening portion, the inner wire guiding passage having a funnel shaped section with a transverse width that widens as the inner wire guiding passage extends from the tip portion to the fastening portion; and
   an elastic seal member including an attaching portion coupled to the tip portion of the mounting member, and a seal portion configured to form a sealing passage that communicates with the inner wire guiding passage, the sealing passage including a first section with a first transverse width and a second section with a second transverse width that is smaller than the first transverse width of the first section to contact an outside surface of the inner wire passing therethrough, the first section being disposed between the funnel shaped section of the inner wire guiding passage of the mounting member and the second section of the sealing passage,
   the fastening portion including an externally threaded section configured to be screwed into the casing.

2. The bicycle cable seal fitting as recited in claim 1, wherein
   the seal portion has a length equal to or greater than 6 millimeters and less than or equal to 15 millimeters.

3. The bicycle cable seal fitting as recited in claim 1, wherein
   the elastic seal member is made of a styrene based elastomer.

4. The bicycle cable seal fitting as recited in claim 1, wherein
   the tip portion of the mounting member includes a generally cylindrically shaped attaching part for attaching the attaching portion of the seal member to the tip portion of the mounting member.

5. The bicycle cable seal fitting as recited in claim 4, wherein
   the cylindrically shaped attaching part has an annular flange with a larger diameter than any other portion of the cylindrically shaped attaching part.

6. The bicycle cable seal fitting as recited in claim 5, wherein
   the first and second sections of the seal portion has a generally cylindrical shape that fits against an internal circumferential surface of the cylindrically shaped attaching part; and the attaching portion of the seal member is configured to extend from the seal portion over a free end surface of the cylindrically shaped attaching part and cover a radially outward facing surface of the cylindrically shaped attaching part to latch onto the outward facing surface of the cylindrically shaped attaching part.

7. The bicycle cable seal fitting as recited in claim 4, wherein
the first and second sections of the seal portion has a generally cylindrical shape that fits against an internal circumferential surface of the cylindrically shaped attaching part; and
the attaching portion of the seal member is configured to extend from the seal portion over a free end surface of the cylindrically shaped attaching part and cover a radially outward facing surface of the cylindrically shaped attaching part to latch onto the outward facing surface of the cylindrically shaped attaching part.

8. A bicycle cable seal fitting for sealing a portion of an inner wire passing into a cable-operated bicycle component casing, the bicycle cable seal fitting comprising:
a mounting member including a tip portion, a fastening portion configured to be fastened to the cable-operated bicycle component casing, and an inner wire guiding passage configured to guide the inner wire though the tip portion and the fastening portion, the inner wire guiding passage having a funnel shaped section with a transverse width that widens as the inner wire guiding passage extends away from the tip portion toward a free end of the fastening portion; and
an elastic seal member including an attaching portion coupled to the tip portion of the mounting member, and a seal portion configured to form a sealing passage that communicates with the inner wire guiding passage, the sealing passage including a first section with a first transverse width and a second section with a second transverse width that is smaller than the first transverse width of the first section to contact an outside surface of the inner wire passing therethrough, the first section being disposed between the funnel shaped section of the inner wire guiding passage of the mounting member and the second section of the sealing passage, the transverse width of the funnel shaped section widening as the inner wire guiding passage extends away from the second section of the sealing passage,
the tip portion of the mounting member including a generally cylindrically shaped attaching part for attaching the attaching portion of the seal member to the tip portion of the mounting member, and
the first and second sections of the seal portion having a generally cylindrical shape that fits against an internal circumferential surface of the cylindrically shaped attaching part, and the attaching portion of the seal member being configured to extend from the seal portion over a free end surface of the cylindrically shaped attaching part and cover a radially outward facing surface of the cylindrically shaped attaching part to latch onto the outward facing surface of the cylindrically shaped attaching part.

9. The bicycle cable seal fitting as recited in claim 8, wherein
the elastic seal member is made of a styrene based elastomer.

10. The bicycle cable seal fitting as recited in claim 8, wherein
the cylindrically shaped attaching part has a free end section with a larger diameter than any other portion of the cylindrically shaped attaching part.

11. A bicycle cable seal fitting comprising:
a mounting member including a tip portion, a fastening portion configured to be fastened to the cable-operated bicycle component casing, and an inner wire guiding passage configured to guide the inner wire through the tip portion and the fastening portion, the inner wire guiding passage having a funnel shaped section with a transverse width that widens as the inner wire guiding passage extends away from the tip portion toward a free end of the fastening portion;
an elastic seal member including an attaching portion coupled to the tip portion of the mounting member, and a seal portion configured to form a sealing passage that communicates with the inner wire guiding passage, the sealing passage including a first section with a first transverse width and a second section with a second transverse width that is smaller than the first transverse width of the first section to contact an outside surface of the inner wire passing therethrough, the first section being disposed between the funnel shaped section of the inner wire guiding passage of the mounting member and the second section of the sealing passage, the transverse width of the funnel shaped section widening as the inner wire guiding passage extends away from the second section of the sealing passage,
the seal portion having a length equal to or greater than 6 millimeters and less than or equal to 15 millimeters,
the tip portion of the mounting member including a generally cylindrically shaped attaching part for attaching the attaching portion of the seal member to the tip portion of the mounting member, and
the first and second sections of the seal portion having a generally cylindrical shape that fits against an internal circumferential surface of the cylindrically shaped attaching part, and the attaching portion of the seal member is being configured to extend from the seal portion over a free end surface of the cylindrically shaped attaching part and cover a radially outward facing surface of the cylindrically shaped attaching part to latch onto the outward facing surface of the cylindrically shaped attaching part.

12. The bicycle cable seal fitting as recited in claim 11, wherein
the elastic seal member is made of a styrene based elastomer.

13. The bicycle cable seal fitting as recited in claim 11, wherein
the cylindrically shaped attaching part has a free end section with a larger diameter than any other portion of the cylindrically shaped attaching part.

* * * * *